United States Patent Office 3,454,518
Patented July 8, 1969

3,454,518
PRINTING INK COMPRISING A DISPERSION OF A PIGMENT AND A BINDER IN AN INERT ORGANIC SOLVENT WHEREIN THE BINDER IS A BLEND OF A METHACRYLATE POLYMER AND POLYVINYLIDENE FLUORIDE
Peter Bernard Kelly, Cincinnati, Ohio, assignor to Formica Corporation, Cincinnati, Ohio, a corporation of Delaware
No Drawing. Filed Apr. 25, 1967, Ser. No. 633,409
Int. Cl. C08f 51/42
U.S. Cl. 260—31.4                                              5 Claims

ABSTRACT OF THE DISCLOSURE

A printing ink comprising a dispersion of a pigment and a binder in an inert organic solvent wherein said binder is a blend of from about 10% to 40% of a polymer selected from the group consisting of a polymer of methyl methacrylate and a polymer of ethyl methacrylate and from about 1% to 20% of polyvinylidene fluoride, wherein the total solids in said ink are between about 20% and 80% wherein all percentages are by weight based on the total weight of said ink.

BACKGROUND OF THE INVENTION

In the printing ink art, a substantial plurality of inks have been known for an exceedingly long period of time, many of which inks are suitable for one purpose, but are frequently unsuitable for other purposes. Printing inks used to impart a decorative effect to paper which is to be used subsequently in the manufacture of decorative laminates have certain peculiar requirements in that they must be capable of being applied to a paper web and, more particularly, to an α-cellulose paper web before or after the treatment by impregnation of the web with a thermosetting resinous material such as a melamine-formaldehyde resin. The printing ink must be compatible with the thermosetting resin used to impregnate the web and, furthermore, the printing ink must be able to withstand the conditions of lamination which require the heating of an assembly of laminae at conventional temperatures and pressures without bleeding and thereby spoiling the appearance of the printed design in the ultimate laminate. The conventional temperatures and pressures and times used in the laminating operation may vary from about 130 to 160° C.; from about 100 p.s.i. to 1200 p.s.i. for periods of time varying between about 10 minutes and 60 minutes.

FIELD OF THE INVENTION

The present invention is in the field of printing inks comprising a dispersion of a pigment and a binder in an inert organic solvent. More particularly, the present invention is in the field of printing inks which are used to impart a decorative effect on a paper web which is ultimately used in a laminated structure comprising the heat and pressure consolidated assembly of a plurality of core sheets which are kraft paper sheets impregnated with a thermosetting phenolic resin, a decorative sheet such as a print sheet and optionally an overlay sheet which has been impregnated also with a melamine-formaldehyde resin and which becomes transparent during the heat and pressure consolidation step. Overlay sheets of other thermosetting, for example, polyester, or thermoplastic, for example, acrylic, resins may also be advantageously used with said ink.

DESCRIPTION OF THE PRIOR ART

The closest prior art of which the instant applicant is aware is the U.S. Patent 3,253,060.

SUMMARY OF THE INVENTION

This invention relates to a printing ink comprising a dispersion of a pigment and a binder in an inert organic solvent wherein said binder is a blend of from about 10% to 40% of a polymer selected from the group consisting of a polymer of methyl methacrylate and a polymer of ethyl methacrylate and from about 1% to 20% of polyvinylidene fluoride, wherein the total solids in said ink are between about 20% and 80% wherein all percentages are by weight based on the total weight of said ink.

One of the objects of the present invention is to produce a printing ink and, more particularly, a printing ink which will find as one of its principal utilities use in the printing of a decorative design on a paper web which is ultimately used as the decorative layer in a plastic laminate. A further object of the present invention is to provide a printing ink which is compatible with thermosetting resins such as melamine-formaldehyde resins and which does not bleed under the conditions of lamination. These and other objects of the present invention will be discussed in greater detail hereinbelow.

As indicated hereinabove, the printing ink of the present invention is comprised of three principal materials, the pigment, the binder and the inert organic solvent medium which provides for the dispersion of the first two components in a vehicle which is used to impart a design on a paper web followed by a heat treatment in which the solvent is flashed off leaving the printed design solidly applied to the paper web.

Nothing is to be found that is critical with respect to the type of pigment which is used as a wide variety of pigments including practically all those known in the art are applicable in the concept of the present invention. Illustrative of the type of pigments that can be used are zinc oxide, titanium dioxide, phthalocyanine greens, phthalocyanine blues, cobalt blues, cadmium reds, cadmium yellows, cadmium mercury reds, naphthol reds and the like. The amount of pigment used in the total composition may vary between about 1% and 60%, by weight, based on the total weight of the printing ink. The amount used will depend on the color and shade desired.

Among the solvents which may be used to disperse the pigment and the blend of polymeric materials in the binder are the glycol ethers, the glycol ether acetates, and mixtures of these solvents with or without aromatic hydrocarbons such as benzene, toluene, xylene, and the like. Additionally, the aforementioned aromatic hydrocarbon solvents may be used alone as the solvent medium. The term "dispersed" as used herein is intended to encompass true solutions of the pigment and the binder in the solvent nedium and is also intended to encompass those situations in which the binder is dissolved or intimately dispersed in the solvent and in which the selected pigment may be relatively insoluble in the solvent and, as a consequence, is merely dispersed throughout the ink. More specifically, one may use such solvents as the ethyl ether of ethylene glycol, the ethyl ether of diethylene glycol, the ethyl ether of ethylene glycol acetate, the propyl ether of ethylene glycol, the propyl ether of ethylene glycol acetate, the ethyl ether of diethylene glycol acetate, the propyl ether of diethylene glycol, the propyl ether of diethylene glycol acetate, the butyl ether of ethylene glycol, the butyl ether of ethylene glycol acetate, the amyl ether of ethylene glycol, the amyl ether of ethylene glycol acetate, the hexyl ether of ethylene glycol acetate, the hexyl ether of ethylene glycol acetate, and the like. The amount of solvent used will normally be between about 20% and 80%, by weight, based on the total weight of the printing ink. Preferably, one would use between about 40% and 60%, by weight, same basis.

The binder is composed of a blend of a methacrylate polymer and polyvinylidene fluoride. In the methacrylate polymer area, one may use polymers of methacrylate and/or polymers of ethyl methacrylate. These polymers may be either homopolymers, copolymers, or terpolymers. When copolymers or terpolymers are used as a part of the binder system, the copolymer or terpolymer should contain preponderant amounts of the methyl methacrylate or ethyl methacrylate, such as about at least 80% of methyl methacrylate or ethyl methacrylate and, correspondingly, not more than about 20%, by weight, of related comonomers which are copolymerizable with said methyl methacrylate or ethyl methacrylate. Included in the group of these comonomers are methyl acrylate, ethyl acrylate, acrylic acid, methacrylic acid, and the like. It is preferred that the amount of methyl methacrylate or ethyl methacrylate used in the copolymers or terpolymers be at least 90%, by weight, based on the total weight of the copolymer or terpolymer and, correspondingly, the comonomers constitute not more than about 10%, by weight, based on the total weight of the copolymer or terpolymer. If methyl methacrylate and ethyl methacrylate are copolymerized with or without a further comonomer, the total amount of methacrylate must still fall within these percentage ranges. The amount of the acrylic polymeric material used in the printing ink may be varied between about 10% and 40%, by weight, based on the total weight of the printing ink and, preferably, between about 15% and 25%, by weight, same basis. If mixtures of homo-, co- or terpolymers of methyl methacrylate or ethyl methacrylate are used, the total amount of methacrylate polymers must still fall within these latter percentage ranges.

The polyvinylidene fluoride component of the binder is preferably homopolymeric vinylidene fluoride, although copolymers of vinylidene fluoride may be used which contain tolerable limits, up to about 5%, by weight, of a second monomer which is compatible with the vinylidene fluoride in a copolymeric material. The second monomer is tolerable so long as the chemical and/or physical properties of the vinylidene fluoride polymer are not materially altered over the properties of the pure homopolymer of vinylidene fluoride. The amount of the polyvinylidene fluoride used in the printing ink may be varied between about 1% and 20%, by weight, based on the total weight of the printing ink and, preferably, between about 10% and 15%, by weight, same basis. The amount of polyvinylidene fluoride used will depend in great measure upon the amount of the pigment in the ink. For instance, in white ink, where a large amount of pigment such as up to about 60%, by weight, based on the total weight of the printing ink is necessary, one should use a relatively large amount of the polyvinylidene fluoride such as between about 10–20%. In black inks, on the other hand, where only about 1% to about 5% of the pigment is used, the lower amounts of the polyvinylidene fluoride may be used.

The overall solids content of these printing inks will range normally between about 20% and 80%, by weight, based on the total weight of the printing ink and, preferably, between about 60% and 70%, by weight, same basis. The solids content of the printing ink encompasses all materials in the ink except the solvent which when flashed off by the heat treating step leaves the residual solid deposit of the ink on the paper.

If desired, one may optionally use in the basic ink formulation other additives such as thixotropy improvers, surfactants, buffering agents, and stabilizers, such as anti-oxidants, ultraviolet light absorbers, and the like, which are added to the ink to improve specific properties of the ink. These additives are well known and a substantial plurality of them are available commercially. These additives may be used in conventional amounts.

One of the outstanding features of the present invention resides in the discovery that the addition of polyvinylidene fluoride as an essential ingredient to these inks greatly improves the adhesion of the inks to surface films which have the reputation of being difficultly adherable particularly in light of the fact that the polyvinylidene fluoride itself is classed, generally, as a difficultly adherable material. It has been found, for example, that inks of the type herein described but without the polyvinylidene fluoride when used in a laminate surfaced with a polyester polymer will result after boiling in water in severe crazing and loss of adhesion. When the polyvinylidene fluoride is added to the same ink this deterioration is significantly alleviated.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

EXAMPLE 1

A silk screen ink is prepared by blending (A) 65 parts of a mixture of 50 parts of titanium dioxide with 15 parts of the butyl ether of ethylene glycol and (B) 35 parts of a mixture of a copolymer of methyl methacrylate and ethyl acrylate, 95/5, respectively, dissolved in 60 parts of the butyl ether of ethylene glycol. 80 parts of this formulation are then blended with 20 parts of powdered polyvinylidene fluoride to form the final product.

EXAMPLE 2

The printing ink of Example 1 was then screened in a conventional manner onto a melamine resin impregnated decorative paper and dried. A laminate assembly is prepared by super-imposing seven kraft paper sheets impregnated with a thermosetting phenolic resin in stacked relationship onto which assembly is positioned the print sheet prepared hereinabove using the ink of Example 1. Onto the print sheet there is superimposed a film of a blend of 60 parts of poly(methyl methacrylate) and, correspondingly, 40 parts of polyvinylidene fluoride. The assembly of laminae are then subjected to a conventional pressure-temperature-time laminating schedule. After the heat and pressure consolidated product is produced, samples are cut from the laminate and immersed in boiling water for two hours. There was no blistering, peeling or delamination and the bond between the ink surface and the uppermost film is excellent. A similar ink prepared without the use of any polyvinylidene fluoride when prepared in a laminated structure as above and subjected to the boiling water test for two hours gave a poor bond and was easily delaminated from the surface film.

EXAMPLE 3

Example 1 is repeated in all essential details except that 87 parts of the mixture of A and B are blended with 13 parts of powdered polyvinylidene fluoride to form the final product.

EXAMPLE 4

Example 2 is repeated in all essential details except that in the place of the ink prepared according to Example 1 there is utilized the ink prepared according to Example 3. Comparably excellent results were achieved.

EXAMPLE 5

Example 4 is repeated in all essential details except that there is positioned onto the print sheet printed with the ink of Example 3 there is superimposed a film of a polyester resin made from fumaric acid, tetrahydrophthalic anhydride, 1,3-butylene glycol and 1,4-cyclohexane dimethanol. This surface film was prepared in accordance with the teachings of the U.S. Patent 3,294,620, which patent is incorporated herein by reference. The resulting laminate when subjected to the boil test in the same manner as outlined in Example 2 hereinabove displayed no blistering, peeling or delamination and the normally present crazing of this top film was very much less than that encountered in an identical laminate, but wherein the ink was devoid of any polyvinylidene fluoride.

I claim:

1. A printing ink comprising a dispersion of a pigment and a binder in an inert organic solvent wherein said binder is a blend of from about 10% to 40% of a polymer selected from the group consisting of a polymer of methyl methacrylate and a polymer of ethyl methacrylate and from about 1% to 20% of polyvinylidene fluoride, wherein the total solids in said ink are between about 20% and 80% wherein all percentages are by weight based on the total weight of said ink.

2. A printing ink according to claim 1 in which the polymer of methyl methacrylate is present in an amount between about 15% and 25% and the polyvinylidene fluoride is present in an amount between about 10% and 15%.

3. A printing ink according to claim 1 in which the polymer of methyl methacrylate is homopolymeric methyl methacrylate.

4. A printing ink according to claim 1 in which the polymer or methyl methacrylate is a copolymer comprising at least about 80% of methyl methacrylate and not more than about 20% of a comonomer copolymerizable with said methyl methacrylate, said percentages being based on the total weight of the copolymer and totaling additively 100%.

5. A printing ink according to claim 4 wherein the comonomer is ethyl acrylate.

References Cited

UNITED STATES PATENTS

| | | | |
|---|---|---|---|
| 3,253,060 | 5/1966 | Koblitz | 260—901 |
| 3,271,347 | 9/1966 | Aronoff | 260—31.4 |
| 3,324,069 | 6/1967 | Koblitz | 260—900 |

MORRIS LIEBMAN, *Primary Examiner.*

P. R. MICHL, *Assistant Examiner.*

U.S. Cl. X.R.

260—33.2, 33.6, 41, 900